United States Patent [19]

Tipton et al.

[11] Patent Number: 4,582,708

[45] Date of Patent: Apr. 15, 1986

[54] ANIMAL FEED SUPPLEMENT

[75] Inventors: Troy E. Tipton, Oklahoma City; Richard P. Hastings, Washington, both of Okla.

[73] Assignee: PRO-VID-ALL, Inc., Norman, Okla.

[21] Appl. No.: 583,116

[22] Filed: Feb. 24, 1984

[51] Int. Cl.$^4$ .......................... A23L 1/28; A23L 1/30; A23K 1/175; A23K 1/18

[52] U.S. Cl. ...................................... 426/62; 426/72; 426/73; 426/74; 426/807

[58] Field of Search ....................... 426/62, 72, 73, 74, 426/807

[56] References Cited

U.S. PATENT DOCUMENTS

| | | | |
|---|---|---|---|
| 3,244,527 | 4/1966 | Baker et al. | 426/73 X |
| 4,055,667 | 10/1977 | Linton et al. | 426/62 |
| 4,265,913 | 5/1981 | Eichelburg | 426/62 |
| 4,357,358 | 11/1982 | Schanze | 426/62 |

FOREIGN PATENT DOCUMENTS 963716  3/1975  Canada .................................. 426/74

Primary Examiner—David M. Naff

[57] ABSTRACT

An animal feed supplement that provides good nutrition is prepared as a homogenous, non-tacky, substantially solid mass. The supplement contains yeast having fermenting activity, a texturizing component selected from ground meal, ground legumes or mixtures thereof, a mineral mixture, a liquid binder, a vitamin mixture, and ground montmorillonite. The yeast is mixed with the texturizing component. This mixture is mixed with the mineral mixture followed by impregnating the resultant mixture with the liquid binder. The resultant mixture is then mixed with the vitamin mixture whereby the vitamin mixture is encapsulated, and the encapsulated vitamin mixture is mixed with the ground montmorillonite.

32 Claims, No Drawings

ANIMAL FEED SUPPLEMENT

BACKGROUND OF THE INVENTION

1. Field of the Invention

The present invention relates to animal food stuffs, and more particularly, but not by way of limitation, to an improved animal feed supplement. In one aspect, the present invention relates to a method for producing an improved animal feed supplement.

2. Discussion of the Prior Art

The diet of animals, such as horses, has long been recognized as an important factor in the development of the animal. Further, the demands placed on today's race and performance horses require increased amounts of available energy for internal work as well as external work. A maintenance diet will not supply these energy demands.

Internal work is done by the body organs to perform vital functions. External work ranges from minimal movement of a horse in a stall or paddock, to the tremendous effort required for racing or performance. External work increases the oxidation of the horse's feed as it is converted to energy. This oxidation process depletes the oxygen supply in the blood stream. To allow the horse to perform at maximum potential, blood building vitamins and minerals are generally fed to the horse to produce additional oxygen-carrying agents in the bloodstream in order to make more energy available to the horse.

Grooming of the animal, especially show and performance horses, is a very important factor for such animals. Outside grooming alone will not give the healthy, illustrous hair coat necessary for winning show horses. Show horses must also be "groomed inside". Thus, vitamins, minerals and enzymes not supplied by maintenance rations must be added.

Another important area of diet of an animal is encountered in breeding. Before one can have a race horse, a performance horse, or a show horse, the mare must first conceive and produce a healthy foal. This process involves potency of the stallion, the health of the mare, milk production of the mare, and the development of the foal before and after birth. Proper nutrition plays a vital role in all of these processes. Since many of the maintenance rations do not contain the amount of vitamins, minerals and enzymes required for the proper nutrition of the mare and the foal, such must often be supplied if one is to be successful in the breeding of the horses and the raising of the desirable foal.

In order to supply the required amount of vitamins, minerals and enzymes not supplied by maintenance rations, feed supplements are recognized as a desirable method for supplementing the diet of the horse to provide such vital components. However, the animal feed supplement is desirably palatable, preferably without the use of artificial flavors and the like. Further, to be totally effective it desirably does not contain artificial preservatives and is not steamed or pelleted during processing, especially if one desires to preserve the stability of the vitamins present in the feed supplement. Therefore, new and improved feed supplements are constantly being sought which provides the desired amount of vitamins, minerals and enzymes required to supplement the maintenance rations of the animal, and provide the animal with good nutrition.

SUMMARY OF THE INVENTION

According to the present invention an improved animal feed supplement is provided which supplements the maintenance rations required for the animal and supplies the desired amount of vitamins, minerals and enzymes required in the sound maintenance of the animal. Broadly, the improved feed supplement comprises (a) from about 25 to about 45 weight percent of a yeast having a fermenting activity (i.e. containing live cells); (b) from about 5 to about 20 weight percent of a texturizing component; (c) from about 10 to about 15 weight percent of a first mineral mixture consisting essentially of from about 18 to about 81 weight percent phosphorus, from about 18 to about 24 weight percent calcium, and a trace amount of fluorine; (d) from about 10 to about 15 weight percent of a second mineral mixture consisting essentially of at least about 22 weight percent sulfur, at least about 18 weight percent potassium, and at least about 11 weight percent magnesium; (e) from about 1 to about 5 weight percent of a liquid binder, such as molasses; (f) from about 0.5 to about 10 weight percent of a vitamin mixture containing from about 60 to about 90 weight percent of a premixed vitamin formulation and from about 10 to about 40 weight percent of substantially pure vitamin A, the premixed vitamin formulation containing at least about 20,000 I.U. of vitamin A, at least about 10,000 I.U. of vitamin D and at least about 2 I.U. of vitamin E per pound of premixed vitamin formulation; and (g) from about 10 to about 30 weight percent ground montmorillonite. The above specified ingredients utilized in the formulation of the feed supplement are employed within the ranges set forth for each ingredient so that the total amount of the ingredients is about one hundred weight percent.

Further according to the present invention an improved method for producing the animal feed supplement is provided wherein the vitamin constituents of the animal feed supplement are substantially encapsulated by a liquid binder so as to preserve the potency of the vitamins without the use of preservatives. Broadly, the method for producing the animal feed supplement comprises: (a) admixing from about 25 to about 55 weight percent of a yeast having fermenting activity with from about 5 to about 20 weight percent of a texturizing component selected from the group consisting of ground meal, ground legumes and mixtures thereof to form a yeast containing mixture; (b) admixing from about 20 to about 30 weight percent of a mineral mixture with the yeast containing mixture to form a substantially homogeneous mineral containing mixture, the mineral mixture consisting essentially of from about 9 to about 40.5 weight percent phosphorus, from about 9 to about 12 weight percent calcium, a trace amount of fluorine, from about 11 to about 24.5 weight percent sulfur, from about 9 to about 24.5 weight percent potassium, and from about 5.5 to about 24.5 weight percent magnesium; (c) admixing from about 1 to about 5 weight percent of a liquid binder with the mineral containing mixture for an effective period of time to allow the liquid binder to substantially impregnate the mineral containing mixture and provide a binder impregnated mineral containing mixture; (d) admixing from about 0.5 to about 10 weight percent of a vitamin mixture with the binder impregnated mineral containing mixture so that the binder impregnated mineral containing mixture substantially encapsulates the vitamin mixture and provides a vitamin encapsulated mineral containing mixture, the vitamin mixture containing from about 60 to about 90 weight percent of a premixed vitamin formulation and from about 10 to about 40 weight percent of substantially pure vitamin A, the premixed vitamin formulation containing at least about 20,000 I.U. of vitamin A, at least about 10,000 vitamin D, and at least about 2 I.U. of vitamin E per pound of premixed vitamin formulation; and (e) admixing from about 10 to about 30 weight percent ground montmorillonite with the vitamin encapsulated mineral containing mixture.

An object of the present invention is to provide an improved animal feed supplement which is palatable and provides controlled amounts of vitamins, minerals and enzymes to the maintenance diet of an animal.

Another object of the present invention, while achieving the before-stated object, is to provide an improved animal feed supplement which does not require artificial preservatives to preserve the potencies of vitamin constituents of the supplement.

Another object of the present invention, while achieving the before-stated objects, is to provide an improved animal feed supplement containing blood building vitamins and minerals adapted to produce additional oxygen-carrying agents in the bloodstream of the animal to make energy available to the animal.

Another object of the present invention, while achieving the before-stated objects, is to provide a method for producing an animal feed supplement wherein the vitamin constituents of a supplement are maintained in their desired level of potency during the preparation, storage and use of such supplement.

Other objects, advantages and features of the present invention will be apparent from the following detailed description when read in conjunction with the appended claims.

DESCRIPTION OF PREFERRED EMBODIMENTS

The present invention provides an improved feed supplement and method for producing same wherein the feed supplement is palatable and the stability of the vitamin constituents are substantially maintained at their predetermined levels without the use of artificial preservatives. The animal feed supplement comprises (a) from about 25 to about 45 weight percent of a yeast having fermenting activity; (b) from about 5 to about 20 weight percent of a texturizing component selected from the group consisting of ground meal, ground legumes and mixtures thereof; (c) from about 10 to about 15 weight percent of a first mineral mixture consisting essentially of from about 18 to about 81 weight percent phosphorus, from about 18 to about 24 weight percent calcium, and a trace amount of fluorine; (d) from about 10 to about 15 weight percent of a second mineral mixture consisting essentially of at least about 22 weight percent sulfur, at least about 18 weight percent potassium, and at least about 11 weight percent magnesium; (e) from about 1 to about 5 weight percent of a liquid binder; (f) from about 0.5 to about 10 weight percent of a vitamin mixture containing from about 60 to about 90 weight percent of a premixed vitamin formulation and from about 10 to about 40 weight percent of substantially pure vitamin A, the premixed vitamin formulation containing at least about 20,000 I.U. of vitamin A, at least about 10,000 I.U. of vitamin D, and at least about 2 I.U. of vitamin E per pound of premixed vitamin formulation; and (g) from about 10 to about 30 weight percent ground montmorillonite. The above-specified ingredients utilized in the formulation of the feed supplement are employed within the ranges setforth for each ingredient so that the total amount of the ingredients is about one hundred weight percent.

The yeast component of the animal feed supplement can be any suitable yeast capable of providing the desired enzymes for converting the maintenance rations and/or components of the animal feed supplement more readily into an energy source for the animal. The yeast component, which possesses fermenting activities (i.e. contains living cells), is desirably the Saccharomyces genus. Typical species of the Saccharomyces genus which can be employed as the yeast component of the animal feed supplement of the present invention are *cerevisiae, fragilis, lactic* and *oviformis*. Especially desirable results have been achieved when the yeast component of the animal feed supplement is *Saccharomyces cerevisiae*.

The amount of the yeast component incorporated into the animal feed supplement can vary widely. Desirably, however, the yeast component will be employed in an amount sufficient to provide from about 25 to about 45 weight percent of the yeast component in the animal feed supplement, and more desirably from about 30 to about 35 weight percent.

The species of the Saccharomyces genus yeast can be prepared by any suitable method known in the art. For example, when employing *Saccharomyces cerevisiae* as the yeast component, the yeast is grown on a medium of ground yellow corn, hominy feed, corn gluten, feed wheat millings, rye millings, diastatic malt and corn syrup, and cane molasses and dried in such a manner as to preserve the fermenting activities of the yeast.

In order to provide the desired body or consistency to the animal feed supplement, the animal feed supplement comprises from about 5 to about 20 weight percent of a texturizing component, and more desirably from about 10 to about 15 weight percent. The texturizing component can be any suitable ground meal, ground legume or mixture thereof. When employing a ground meal as the texturizing component of the feed supplement the ground meal is desirably a soybean meal, corn meal, oat meal or mixture thereof. On the other hand, when the texturizing component is a ground legume, the legume is desirably alfalfa, vetch, mixtures thereof and the like. As with the meal, the legumes are desirably ground in order to provide the feed supplement with the desired consistency and texture.

In order to replenish the oxygen supply in the bloodstream of the animal depleted as the animal's system oxidizes the maintenance rations and converts the maintenance rations into energy, the animal feed supplement is provided with from about 20 to about 30 weight percent of a mineral mixture containing phosporus, calcium, fluorine, sulfur, potassium and magnesium. The amount of each of the constituents present in the mineral mixture can vary widely. Generally, however, the mineral mixture is formulated so as to desirably contain from about 9 to about 40.5 weight percent phosphorus, from about 9 to about 12 weight percent calcium, a trace of fluorine (i.e. less than 0.2 weight percent), from about 11 to about 24.5 weight percent sulfur, from about 9 to about 24.5 weight percent potassium and from about 5.5 to about 24.5 weight percent magnesium. Desirably, however, the mineral mixture is incorporated into the yeast containing mixture of the texturizing component in the formulation of the animal feed supplement as a first mineral mixture and a second mineral mixture. In such instance, the animal feed supplement will contain from about 10 to about 15 weight percent of the first mineral mixture; and from about 10 to about 15 weight percent of the second mineral mixture. The first mineral mixture desirably contains from about 18 to about 81 percent phosphorus, from about 18 to about 24 weight percent calcium and a trace amount of fluorine. The trace amount of fluorine present in the first mineral mixture can vary widely but will generally be less than about 0.2 weight percent fluorine. The second mineral mixture consists essentially of at least 22 weight percent sulfur, at least about 18 weight percent potassium, and at least about 11 weight percent magnesium.

As previously stated, the first and second mineral mixtures are desirably incorporated into the feed supplement as separate components, in which case each of the mineral mixtures will be added in an amount sufficient to provide from about 10 to about 15 weight percent in the final feed supplement; or, in the alternative, the mineral mixture can be blended to contain the required amount of each of the elements, in which case the resulting mineral mixture would be incorporating in an amount sufficient to provide from about 20 to about 30 weight percent of the animal feed supplement.

In order to make the feed supplement more palatable, and to bind the constituents of the supplement into a substantially homogeneous mass, the feed supplement contains from about 1 to about 5 weight percent of a liquid binder. Any suitable liquid binder capable of binding the constituents of the feed supplement into a homogeneous mass, while at the same time preventing the feed supplement from becoming tacky and/or resulting in a substantially solid mass, can be employed as the liquid binder. Typical of such materials which may be employed as the liquid binder of the feed supplement of the present invention are molasses, corn syrup, honey and the like. However, especially desirable results have been obtained when the liquid binder is molasses, and the liquid binder is employed in the formulation of the feed supplement in an amount sufficient to provide about 2 to about 3 weight percent of the liquid binder in the feed supplement.

The liquid binder, in addition to assisting in the formulation of a substantially homogeneous mass of the feed supplement further acts as an encapsulating agent for vitamins incorporated into the feed supplement so as to preserve the stability of the vitamins. Thus, another ingredient of the feed supplement is a vitamin mixture. The amount of the vitamin mixture incorporated into the binder impregnated mineral containing mixture can vary widely, but will desirably be an amount sufficient to provide from about 0.5 to 10 weight percent of the vitamin mixture in the animal feed supplement. Desirably, the vitamin mixture will contain from about 60 to about 90 weight percent of a premixed vitamin formulation and from about 10 to about 40 weight percent of substantially pure vitamin A, more desirably from about 70 to about 75 weight percent of the premixed vitamin formulation and from about 25 to about 30 weight percent of the substantially pure vitamin A.

The premixed vitamin formulation constituent of the vitamin mixture, which comprises from about 60 to about 90 weight percent, and more desirably from about 70 to about 75 weight percent of the vitamin mixture of the animal feed supplement, desirably contains at least about 20,000 I.U. of vitamin A, at least about 10,000 I.U. of vitamin D, and at least about 2 I.U. of vitamin E per pound of premixed vitamin formulation. More desirably, the premixed vitamin formulation will contain from about 20,000 I.U. to about 200,000 I.U. of vitamin A, about 10,000 I.U. to about 100,000 I.U. of vitamin D, and from about 2 to about 200 I.U. of vitamin E per pound of the premixed vitamin formulation.

The pure vitamin A constituent of the vitamin mixture, which makes up from about 10 to about 40 weight percent of the vitamin mixture, more desirably from about 25 to about 30 weight percent, will generally contain at least about 50,000 I.U. of vitamin A per pound, and more generally from about 1,000,000 I.U. to about 10,000,000 I.U. of vitamin A per pound. However, as previously stated the potency of the various vitamins can vary widely because the stability of the vitamins are substantially maintained by the encapsulation of the vitamins with the liquid binder constituent, such as molasses, and artificial preservatives are not required in the feed supplement to maintain the potency and stability of the vitamin constituents.

In addition to each of the before mentioned constituents, the animal feed supplement of the present invention further contains from about 10 to about 30 weight percent finely ground montmorillonite. Montmorillonite is an acidic clay constituent generally represented by the formula $(Mg.Ca)O.Al_2O_3.4Si_2.nH_2O$. The amount of montmorillonite incorporated into the animal feed supplement can vary widely. However, desirable results have been obtained when the montmorillonite is used in an amount sufficient to provide from about 10 to about 30 weight percent of the montmorillonite in the animal feed supplement, and more desirably from about 15 to about 20 weight percent.

In addition to the above constituents, the animal feed supplement of the present invention may further include from about 8 to about 12 weight percent ground rock salt. When incorporating the rock salt into the animal feed supplement, the rock salt is desirably finely ground so as to permit the rock salt to be uniformly dispersed throughout the animal feed supplement. To increase the palatability of the animal feed supplement it may be desirable to incorporate an effective amount of a flavoring agent into the vitamin mixture. The amount of flavoring agent employed can vary widely, but will desirably be an amount effective to provide from about 0.1 to about 1 weight percent of the flavoring agent in the animal feed supplement. Because of the use of the liquid binder heretofore set forth, the flavoring agent will maintain its desired flavor characteristics in the animal feed supplement without the use of artificial preservatives because the liquid binder substantially encapsulates the artificial flavor along with the vitamins as heretofore described. Any suitable flavoring agent can be employed to increase and/or improve the palatability of the animal feed supplement, although desirable results have been obtained when the flavoring agent is provided with the flavor of apple.

The animal feed supplement of the present invention is palatable and the potency of the vitamins are stabilized without the use of artificial preservatives. Further, the animal feed supplement is a substantially homogeneous, non-tacky composit supplement which can be easily handled. In addition, the feed supplement can be fed to the animal, per se, or can be blended with the normal maintenance rations of the animal.

The amount of the feed supplement fed to an animal will vary greatly, depending upon whether the animal is a mature animal, a weanling, and whether the animal is a stallion or a mare. For example, desirable results have been obtained where the feed supplement is fed to weanlings and yearlings in an amount of approximately four (4) and six (6) ounces, respectively, per day. On the other hand, if the feed supplement is fed to a mature horse the amount fed will generally range from about six (6) ounces to about eight (8) ounces per day, depending on whether the horse is idle or under heavy working conditions. For mature horses in a period of late gestation, an amount of about eight (8) ounces per day is recommended; whereas a horse in peak lactation is generally fed an amount of the feed supplement sufficient to provide about ten (10) ounces per day of the feed supplement. However, it should be understood that the amount of the feed supplement fed to the animal per day can vary widely and will depend to a large degree upon the condition of the animal, its age, and the like.

The animal feed supplement of the present invention is produced using a series of process steps so that the liquid binder constituent substantially encapsulates the vitamin constituents and stabilizes the vitamins without the use of artifical preservatives and the like. Broadly, the method comprises admixing from about 25 to about 45 weight percent, more desirably from about 30 to about 35 weight percent, of the yeast constituent having fermenting activities with from about 5 to about 20 weight percent, more desirably from about 10 to about 15 weight percent, of the texturizing component to form a yeast containing mixture. Thereafter, from about 20 to about 30 weight percent of a mineral mixture are admixed with the yeast containing mixture to form a substantially homogeneous mineral containing mixture. The mineral containing mixture consists essentially of from about 9 to about 40.5 weight percent phosphorus, from about 9 to about 12 weight percent calcium, a trace amount of fluorine (i.e. less than about 0.2 weight percent), from about 11 to about 24 weight percent sulfur, from about 9 to about 24.5 weight percent potassium, and from about 5.5 to about 24.5 weight percent magnesium.

The mineral mixture is desirably incorporated into the yeast containing mixture as a first mineral mixture and a second mineral mixture. In such instance, from about 10 to about 15 weight percent of a first mineral mixture and from about 10 to about 15 weight percent of a second mineral mixture are admixed with the yeast containing mixture. The first mineral mixture desirably contains from about 18 to about 81 weight percent phosphorus, from about 18 to about 24 weight percent calcium, and a trace amount of fluorine (i.e. not more than about 0.2 weight percent fluorine); whereas the second mineral mixture contains at least about 22 weight percent sulfur, at least about 18 weight percent potassium, and at least about 11 weight percent magnesium. It should be understood that the first and second mineral mixtures employed to form the mineral mixture admixed with the yeast containing mixture can be incorporated into the yeast containing mixture either stepwise, simultaneously, or can be premixed and added thereto as a single mineral mixture.

Once the substantially homogeneous mineral containing mixture has been formed from about 1 to about 5 weight percent, more desirably from about 2 to about 3 weight percent, of the liquid binder are admixed with the mineral containing mixture for an effective period of time to allow the liquid binder to substantially impregnate the mineral containing mixture and provide a binder impregnated mineral containing mixture. The amount of time required to enable the liquid binder to thoroughly impregnate the mineral containing mixture can vary widely and will depend to a large degree upon the speed of agitation of the mixer and/or the quantity of ingredients present in the mixer. Generally, however, the liquid binder can be thoroughly dispersed throughout the mineral containing mixture so as to substantially impregnate the mineral containing mixture and provide the binder impregnated mineral containing mixture in a period of from about 3 to about 5 minutes.

When it has been determined that the liquid binder has substantially impregnated the mineral containing mixture and a resulting, substantially uniform binder impregnated mineral containing mixture has been obtained, from about 0.5 to about 10 weight percent of a vitamin mixture are admixed with the binder impregnated mineral containing mixture so that the binder impregnated mineral containing mixture substantially encapsulates the vitamin mixture and provides a vitamin encapsulated mineral containing mixture. The vitamin mixture incorporated into the binder impregnated mineral containing mixture will desirably be a mixture of a premixed vitamin formulation and substantially pure vitamin A. The amounts of the premixed vitamin formulation and the substantially pure vitamin A in the vitamin mixture can vary widely. However, the premixed vitamin formulation will generally be employed in an amount sufficient so that the vitamin mixture contains from about 60 to about 90 weight percent of the premixed vitamin formulation, more desirably from about 70 to about 75 weight percent. The substantially pure vitamin A will thus be generally employed in an amount sufficient so that the vitamin mixture contains from about 10 to about 40 weight percent of the substantially pure vitamin A, more desirably from about 25 to about 30 weight percent. Desirably, the vitamin mixture is formulated in a separate vessel so that the premixed vitamin formulation is substantially homogeneous (i.e. the premixed vitamin formulation and the substantially pure vitamin A) are thoroughly and completely admixed.

The premixed vitamin formulation admixed with the substantially pure vitamin A to form the vitamin mixture incorporated into the binder impregnated mineral containing mixture will desirably contain at least about 20,000 I.U. of vitamin A, more desirably from about 20,000 I.U. to about 200,000 I.U. of vitamin A, at least about 10,000 I.U. of vitamin D, more desirably from about 10,000 I.U. to about 100,000 I.U. of vitamin D, and at least about 2 I.U. of vitamin E, more desirably from about 2 I.U. to about 200 I.U. of vitamin E, per pound of premixed vitamin formulation. Similarly, the pure vitamin A admixed with the premixed vitamin formulation to produce the vitamin mixture incorporated into the animal feed supplement of the present invention will desirably contain at least about 50,000 I.U. of vitamin A per pound, and more desirably from about 1,000,000 I.U. to about 10,000,000 I.U. per pound.

When it has been determined that the vitamin mixture has been thoroughly dispersed throughout the binder impregnated mineral containing mixture so that the liquid binder substantially encapsulates the vitamin components of the vitamin mixture, from about 10 to about 30 weight percent, more desirably from about 15 to about 20 weight percent, of ground montmorillonite are incorporated into the vitamin encapsulated mineral containing mixture. The montmorillonite is thoroughly blended with the vitamin encapsulated mineral containing mixture and stirring is continued until the resulting mass, the animal feed supplement of the present invention, is in an easily handled, non-tacky condition so that the resulting animal feed supplement can be removed from the mixture utilizing conveyer and hopper mechanisms for packaging in airtight sealed containers.

The animal feed supplement produced above will desirably contain in addition to the beforementioned ingredients, from about 8 to about 12 weight percent of finely ground rock salt and from about 0.1 to about 1 weight percent of a flavoring agent. When incorporating the finely ground rock salt into the animal feed supplement the beforementioned amounts of finely ground rock salt (e.g. from about 8 to about 12 weight percent) can be admixed with the mineral containing mixture prior to the addition of the liquid binder, or can be admixed simultaneously with the mineral mixture into the yeast containing mixture. On the other hand, the flavoring agent is desirably admixed with the vitamin mixture in the second mixing vessel during the mixing of the premixed vitamin formulation and the substantially pure vitamin A so that the flavoring agent is incorporated into the vitamin mixture prior to addition of the vitamin mixture to the binder impregnated mineral containing mixture. The ingredients employed in the formulation of the animal feed supplement in accordance with the above-described process are employed within the ranges setforth for each ingredient so that the total amount of the ingredients present in the feed supplement is about one hundred weight percent.

In order to more fully describe the present invention the following example is provided. However, it is to be understood that the example is for illustrative purpose only and should not be construed as limiting the scope of the invention as set forth and defined in the appended claims.

EXAMPLE 400 pounds of cultivated live yeast culture (Saccharomyces cerevisiae) and 150 pounds of soybean meal were introduced into a mixer equipped with an agitator. After the addition of the yeast culture and the soybean meal the agitator was activated. For the remainder of the process the agitator was maintained in its activated state and all ingredients introduced into the mixer were carried out while the agitator was in its activated state.

Once the yeast culture and soybean meal had been thoroughly admixed 150 pounds of a first mineral mixture, 150 pounds of a second mineral mixture and 100 pounds of finely ground rock salt were added to the mixing vessel and thoroughly dispersed throughout the mixture of the soybean meal and yeast. The first mineral mixture (manufactured by IMC and sold under the trademark Dynafos) contained not less than 18.5 weight percent phosporous, 24 weight percent calcium and not more than 0.185 weight percent fluorine; the second mineral mixture (manufactured by IMC and sold under the trademark Dynamate) contained not less than 22 weight percent sulfur, not less than 18 weight percent potassium, and not less than 11 weight percent magnesium. Mixing was continued for about five minutes until a substantially uniform mass of the yeast, soybean meal, the first and second mineral mixtures, and the ground rock salt had been achieved. After the five minute period approximately 5½ gallons of liquid molasses (approximately 25.5 pounds) was slowly added to the admixture and the molasses containing mixture allowed to mix for a period of from about 3 to about 5 minutes so as to permit the liquid molasses to thoroughly impregnate the solid mixture.

A vitamin mixture for incorporation into the binder impregnated mineral containing mixture was prepared in a second mixing vessel equipped with an agitator. The vitamin mixture was formed by admixing 5.5 pounds of a premixed vitamin formulation (manufactured by Mountaire Vitamins and marketed under the name Prime Quality and containing at least 10,000,000 I.U. Vitamin A, at least 5,000,000 I.U. Vitamin D-3, and at least 1,000 I.U. Vitamin E) with 2 pounds of substantially pure vitamin A (manufactured by Roche and marketed under the name Rovimix A-30, a stabilized Vitamin A acetate containing not less than 13,608,000 I.U. of Vitamin A per pound) and 2 pounds of apple flavoring. The resulting mixture was thoroughly stirred until a substantially homogeneous vitamin mixture resulted. Thereafter, the vitamin mixture was introduced into the first mixing vessel containing the binder impregnated mineral containing mixture and mixing was continued for an effective period of time to ensure that the vitamin mixture was thoroughly dispersed throughout the binder impregnated mineral containing mixture. The addition of the vitamin mixture to the binder impregnated mineral containing mixture enables the binder to substantially encapsulate the vitamins and to preserve the potency of the vitamins without the need for artificial preservatives and the like.

Once the vitamin mixture had been thoroughly dispersed throughout the binder impregnated mineral containing mixture 200 pounds of finely ground montmorillonite was introduced into the mixing vessel. A semi-quantitative spectrographic analysis of the montmorillonite used in the preparation of the feed supplement is set forth on the following page.

| ANALYSIS OF MONTMORILLONITE | |
|---|---|
| Silicone | 20.0% |
| Iron | 4.6% |
| Aluminum | 12.0% |
| Potassium | 4.8% |
| Sodium | 4.4% |
| Magnesium | 1.1% |
| Lead | Trace less than 0.001% |
| Galium | 0.010% |
| Vanadium | 0.030% |
| Copper | 0.0095% |
| Nickel | 0.0027% |
| Zirconium | 0.019% |
| Cobalt | trace less than 0.001% |
| Strontium | 0.095% |
| Cromium | 0.019% |
| Other Elements | NIL |

The above described montmorillonite was recovered from mines located in Lyon County, Nev.

The montmorillonite was carefully blended throughout the mass in the blender and blending was continued until a substantially non-tacky, uniform appearing product was obtained. When it was determined that the resulting means was in a non-tacky condition stirring was discontinued and the contents removed for packaging in airtight containers.

The feed supplement prepared in accordance with the procedures set forth in the example has been found to be palatable and provides a well balanced supplement useful in the sound maintenance of horses.

It is clear that the present invention is well adapted to carry out the objects and attain the ends and advantages mentioned herein as well as those inherent in the invention. While a presently preferred embodiment of the invention has been described for purposes of this disclosure, numerous changes may be made which will readily suggest themselves to those skilled in the art and which are accomplished within the spirit of the invention disclosed and as defined in the appended claims.

What is claimed is:

1. An animal feed supplement comprising:
   (a) from about 25 to about 45 weight percent of a yeast having fermenting activity;
   (b) from about 5 to about 20 weight percent of a texturizing component selected from the group consisting of ground meal, ground legumes and mixtures thereof;
   (c) from about 20 to about 30 weight percent of a mineral mixture consisting essentially of from about 9 to about 40.5 weight percent phosphorus, from about 9 to about 12 weight percent calcium, a trace amount of fluorine of less than about 0.2 weight percent, at least about 11 weight percent sulfur, at least about 9 weight percent potassium and at least about 5.5 weight percent magnesium;
   (d) from about 1 to about 5 weight percent of a liquid binder capable of binding constituents of the feed supplement into a homogeneous mass, while at the same time preventing the feed supplement from becoming tacky and resulting in a substantially solid mass;
   (e) from about 0.5 to about 10 weight percent of a vitamin mixture containing from about 60 to about 90 weight percent of a premixed vitamin formulation and from about 10 to about 40 weight percent of substantially pure vitamin A, the premixed vitamin formulation containing at least about 20,000 I.U. of vitamin A, at least about 10,000 I.U. of vitamin D, and at least about 2 I.U. of vitamin E per pound of premixed vitamin formulation; and,
   (f) from about 10 to about 30 weight percent ground montmorillonite, said ingredients being employed in the formulation of the feed supplement within the ranges specified for each ingredient so that the total amount of the ingredients is about one hundred weight percent.

2. The animal feed supplement of claim 1 wherein the mineral mixture is formed from a first and a second mineral mixture, and wherein the animal feed supplement comprises:
   (a) from about 10 to about 15 weight percent of a first mineral mixture, the first mineral mixture consisting essentially of from about 18 to about 81 weight percent phosphorus, from about 18 to about 24 weight percent calcium, and a trace amount of fluorine; and
   (b) from about 10 to about 15 weight percent of a second mineral mixture, the second mineral mixture consisting essentially of at least about 22 weight percent sulfur, at least about 18 weight percent potassium, and at least about 11 weight percent magnesium.

3. The animal feed supplement of claim 2 comprising: from about 8 to about 12 weight percent rock salt.

4. The animal feed supplement of claim 2 further comprising:
   from about 0.1 to about 1 weight percent of a flavoring agent.

5. The animal feed supplement of claim 1 further comprising:
   from about 8 to about 12 weight percent of finely ground rock salt; and
   from about 0.1 to about 1 weight percent of a flavoring agent.

6. The animal feed supplement of claim 5 wherein the yeast is of the Saccharomyces genus and is a species of the Saccharomyces genus selected from the group consisting of *cerevisiae, fragilis, lactic* and *oviformis*.

7. The animal feed supplement of claim 6 wherein the yeast is *Saccharomyces cerevisiae* yeast.

8. The animal feed supplement of claim 5 wherein the yeast is present in the feed supplement in an amount of from about 30 to 35 weight percent and the yeast is of the Saccharomyces genus and is selected from a species consisting of *cerevisiae, fragilis, lactic* and *oviformis*.

9. The animal feed supplement of claim 8 wherein the texturing component is present in the feed supplement in an amount of from about 10 to about 15 weight percent.

10. The animal feed supplement of claim 9 wherein the texturizing component is ground meal.

11. The animal feed supplement of claim 10 wherein the ground meal is selected from the group consisting of soybean meal, corn meal, oat meal and mixtures thereof.

12. The animal feed supplement of claim 9 wherein the liquid binder is present in an amount of from about 2 to about 3 weight percent, and the liquid binder is molasses.

13. The animal feed supplement of claim 9 wherein the vitamin mixture contains from about 70 to about 75 weight percent of the premixed vitamin formulation and from about 25 to about 30 weight percent substantially pure vitamin A.

14. The animal feed supplement of claim 13 wherein the premixed vitamin formulation contains about 20,000 I.U. to about 200,000 I.U. of vitamin A, about 10,000 I.U. to about 100,000 I.U. of vitamin D, and from about 2 to about 200 I.U. of vitamine E per pound of premixed vitamin formulation.

15. The animal feed supplement of claim 14 wherein the pure vitamin A of the vitamin mixture contains at least about 50,000 I.U. per pound.

16. The animal feed supplement of claim 15 wherein the pure vitamin A contains from about 1,000,000 I.U. to about 10,000,000 I.U. per pound.

17. The animal feed supplement of claim 13 wherein the montmorillonite is present in an amount of from about 15 to about 20 weight percent.

18. The animal feed supplement of claim 17 wherein the texturing component is ground meal, and the gound meal present in an amount of from about 10 to about 15 weight percent.

19. A method for producing an animal feed supplement comprising:
   (a) admixing from about 25 to about 55 weight percent of a yeast having fermenting activity with from about 5 to about 20 weight percent of a texturizing component selected from the group consisting of ground meal, ground legumes and mixtures thereof to form a yeast containing mixture;
   (b) admixing from about 20 to about 30 weight percent of a mineral mixture with the yeast containing mixture to form a substantially homogeneous mineral containing mixture, the mineral mixture consisting essentially of from about 9 to about 40.5 weight percent phosphorus, from about 9 to about 12 weight percent calcium, a trace amount of fluorine of less than about 0.2 weight percent, from about 11 to about 24.5 weight percent sulfur, from about 9 to about 24.5 weight percent potassium and from about 5.5 to about 24.5 weight percent magnesium;

(c) admixing from about 1 to about 5 weight percent of a liquid binder capable of binding constituents of the feed supplement into a homogeneous mass, while at the same time preventing the feed supplement from becoming tacky and resulting in a substantially solid mass with the mineral containing mixture for an effective period of time to allow the liquid binder to substantially impregnate the mineral containing mixture and provide a binder impregnated mineral containing mixture;

(d) admixing from about 0.5 to about 10 weight percent of a vitamin mixture with the binder impregnated mineral containing mixture so that the binder impregnated mineral containing mixture substantially encapsulates the vitamin mixture and provides a vitamin encapsulated mineral containing mixture, the vitamin mixture containing from about 60 to about 90 weight percent of a premixed vitamin formulation and from about 10 to about 40 weight percent of substantially pure vitamin A, the premixed vitamin formulation containing at least about 20,000 I.U. of vitamin A, at least about 10,000 I.U. of vitamin D, and at least about 2 I.U. of vitamin E per pound of premixed vitamin formulation; and, (e) admixing from about 10 to about 30 weight percent ground montmorillonite with the vitamin encapsulated mineral containing mixture, the amount of each of the ingredients being variable within the ranges specified for each ingredient so that the total of the ingredients is about one hundred weight percent.

20. The method for producing an animal feed supplement of claim 19 wherein the mineral mixture is formed by admixing a first and second mineral mixture, the method further comprising admixing from about 10 to about 15 weight percent of the first mineral mixture and from about 10 to about 15 weight percent of the second mineral mixture with the yeast containing mixture, the first mineral mixture consisting essentially of from about 18 to about 81 weight percent phosphorus, and from about 18 to about 24 weight percent calcium, and a trace amount of fluorine of less than about 0.2 weight percent; the second mineral mixture consisting essentially of at least 22 weight percent sulfur, at least 18 weight percent potassium, and at least about 11 weight percent magnesium.

21. The method for producing an animal feed supplement of claim 20 further comprising:
admixing from about 8 to about 12 weight percent of ground rock salt with the mineral containing mixture prior to admixing the mineral containing mixture with the liquid binder.

22. The method for producing an animal feed supplement of claim 21 further comprising:
admixing from about 0.1 to about 1 weight percent of a flavoring agent with the vitamin mixture prior to admixing the vitamin mixture with the binder impregnated mineral containing mixture.

23. The method for producing an animal feed supplement of claim 22 wherein the vitamin mixture is formed by admixing the premixed vitamin formulation, the substantially pure vitamin A and the flavoring agent in a separate mixing vessel for a period of time effective to form a substantially homogeneous vitamin mixture.

24. The method for producing an animal feed supplement of claim 22 wherein the yeast is of the Saccharomyces genus and is selected from the species consisting of *cerevisiae, fragilis, lactic* and *oviformis*.

25. The method for producing an animal feed supplement of claim 24 wherein the yeast component is *Saccharomyces cerevisiae*.

26. The method for producing an animal feed supplement of claim 20 wherein the vitamin mixture is prepared by admixing from about 70 to about 75 weight percent of a premixed vitamin formulation with from about 25 to about 30 weight percent of substantially pure vitamin A.

27. The method for producing an animal feed supplement of claim 26 wherein the premixed vitamin formulation contains about 20,000 I.U. to about 200,000 I.U. of vitamin A, about 10,000 I.U to about 100,000 I.U. of vitamin D and about 2 I.U. to about 200 I.U. of vitamin E per pound of premixed vitamin formulation.

28. The method for producing an animal feed supplement of claim 27 wherein the substantially pure vitamin A contains at least about 50,000 I.U. per pound.

29. The method for producing an animal feed supplement of claim 28 wherein the premixed vitamin formulation is admixed with the substantially pure vitamin A to form the vitamin mixture prior to admixing the vitamin mixture with the binder impregnated mineral containing mixture.

30. The method for producing an animal feed supplement of claim 26 further comprising:
admixing from about 0.1 to about 1 weight percent of a flavoring agent with the vitamin mixture prior to admixing the vitamin mixture with the binder impregnated mineral containing mixture.

31. The method for producing an animal feed supplement of claim 26 further comprising:
admixing from about 8 to about 12 weight percent of finely ground rock salt with the mineral containing mixture prior to the addition of the liquid binder.

32. The method for producing an animal feed supplement of claim 31 further comprising:
admixing from about 0.1 to about 1 weight percent of a flavoring agent with the vitamin mixture prior to admixing the vitamin mixture with the binder impregnated mineral containing mixture.

* * * * *